United States Patent [19]
Ito

[11] 4,031,985
[45] June 28, 1977

[54] MECHANICAL DISC BRAKE

[75] Inventor: Hiroshi Ito, Kawasaki, Japan

[73] Assignee: Tokico Ltd., Kawasaki, Japan

[22] Filed: Oct. 12, 1976

[21] Appl. No.: 731,202

[30] Foreign Application Priority Data

Oct. 20, 1975    Japan .......................... 50-126149

[52] U.S. Cl. ..................... 188/71.9; 188/196 BA
[51] Int. Cl.² ............................................ F16D 65/56
[58] Field of Search ........... 188/71.9, 72.6, 79.5 K, 188/79.5 G, 79.5 E, 79.5 P, 196 BA

[56] References Cited
UNITED STATES PATENTS

| | | | |
|---|---|---|---|
| 3,211,263 | 10/1965 | Harrison | 188/196 BA |
| 3,365,031 | 1/1968 | Swift | 188/71.9 |
| 3,709,333 | 1/1973 | Buyze | 188/71.9 |
| 3,920,102 | 11/1975 | Ito | 188/71.9 |

*Primary Examiner*—Duane A. Reger
*Attorney, Agent, or Firm*—Schmidt, Johnson, Hovey & Williams

[57] ABSTRACT

A mechanical disc brake comprising a rotary input shaft, a bolt connected at one end to said shaft and abutting at the other end against a friction pad, a nut threaded on said bolt to normally bias said input shaft and a ratchet mechanism provided between said input shaft and nut to transmit the rotation of the input shaft to the nut to thereby displace said bolt toward said friction pad.

3 Claims, 5 Drawing Figures

MECHANICAL DISC BRAKE

This invention relates to a mechanical disc brake and more particularly, to a mechanical disc brake having an automatic clearance adjusting device. There have been proposed and practically employed a great variety of mechanical disc brakes having an automatic clearance adjusting device, but the conventional mechanical devices of the type can not easily effect stable clearance adjustment due to the deformation of the caliper housing and the influence of the operation lever when the brake is applied, also, they have a relatively great number of parts, and are complicated in construction and expensive.

In order to eliminate the disadvantages inherent in the conventional disc brakes of the type referred to hereinabove, the applicant has previously proposed an improved mechanical disc brake having an automatic clearance adjusting device as shown in Japanese Pat. Appl. No. 8389/1973 filed Jan. 19, 1973. The disc brake of this Japanese patent application can satisfactorily effect stable automatic clearance adjustment free of any adverse effects by the deformation of the caliper housing and variation in the manipulation force of the manipulation lever, has a relatively small number of parts and is durable and less expensive. However, the disc brake of the Japanese patent application still has the disadvantage that the clearance adjusting nut tends to rotate freely when the vehicle sways resulting in inadvertent variation of clearance.

Thus, the present invention is to provide a disc brake having an automatic clearance adjusting nut the free rotation of which is controlled so as to perfectly prevent inadvertent variation in the brake clearance even when the vehicle sways.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

Figure 1:
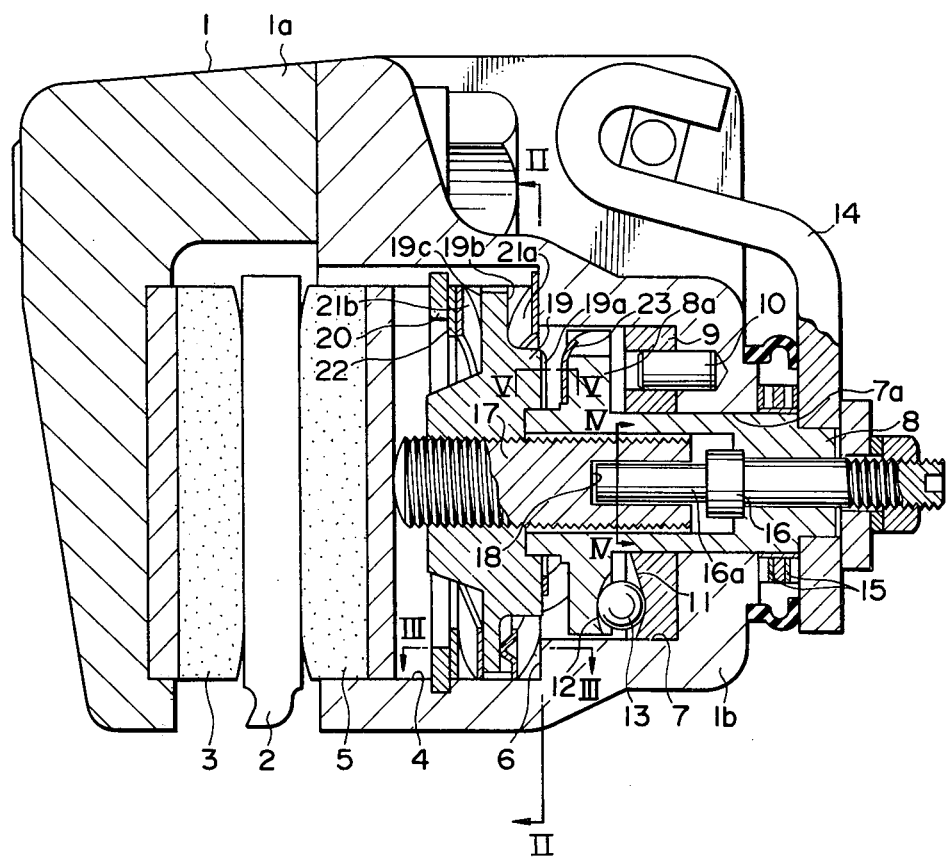
FIG. 1 is a longitudinally sectional view of one preferred embodiment of mechanical disc brake of the invention.
Figure 2:
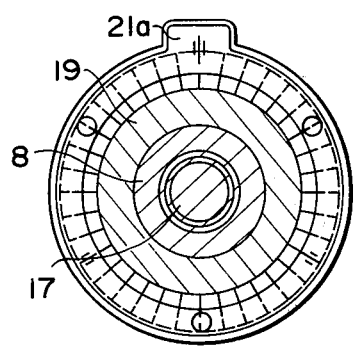
FIG. 2 is a cross-sectional view taken along substantially the line II—II of and as seen in the arrow direction in FIG. 1.

The present invention will be now described referring to the accompanying drawings and more particularly, to FIG. 1 thereof. In FIG. 1, reference numeral 1 denotes a caliper housing comprising two half portions 1a, 1b. A friction pad 3 is attached to the caliper housing left-hand half portion 1a (as seen in FIG. 1) by conventional means in opposition to one side of a disc 2 and a similar friction pad 5 is slidably disposed within a bore 4 defined by the caliper housing right-hand half portion 1b (as seen in FIG. 1). The right-hand half portion 1b further defines a smaller diameter bore 7 in communication with the larger diameter bore 4 and a shoulder 6 is formed between the bores 4 and 7. The caliper housing right-hand half portion 1b still further defines a further reduced diameter bore 7a which is in communication at one or the inner end with the bore 7 with the other or outer end extending through the bottom wall of the half portion 1b. A flanged hollow input shaft 8 is received within the bores 4, 7, 7a for both rotation and axial displacement within these bores. An annular ramp plate 9 in which the input shaft 8 is freely received is provided within the bore 7 and secured to the caliper housing half portion 1b against rotation by means of pin means 10.

The ramp plate 9 and the flange 8a of the shaft 8 which is also received within the bore 7 are formed on their opposing surfaces with at least two spherical recesses 11, 12, respectively, for receiving a ball 13 therebetween.

A waved washer 15 is fitted on the portion of the shaft 8 which extends out of the caliper housing half portion 1b and a manipulation lever 14 is also secured to the extension of the shaft 8 on the outer side of the washer 15 by conventional means. A dust cover is preferably provided about on the extension of the shaft 8 between the bottom wall of the half portion 1b and the lever 14 in a peripherally spaced relation to the outer periphery of the waved washer 15 to protect the washer. The input shaft 8 is normally biassed rightwards (as seen in FIG. 1) by the spring force provided by the waved washer 15 and the spring force is received by the ramp plate 9 through the flange 8a on the shaft 8 and the ball 13.

Figure 4:
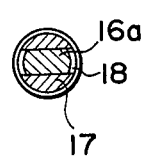
FIG. 4 is a cross-sectional view taken along substantially the line IV—IV of and as seen in the arrow direction in FIG. 1.

The input shaft 8 is a hollow member including two different diameter bore portions and a portion of a stop 16 is received within the smaller diameter bore portion of the shaft 8. The right-hand end portion of the stop 16 (as seen in FIG. 1) is threaded to receive a suitable nut thereon to provide means to secure the lever 14 to the shaft 8. The stop 16 is provided in an intermediate position between the opposite ends thereof with a flange having a diameter greater than that of the smaller diameter bore portion of the shaft 8 and partially fitted in the wall which defines the smaller diameter bore portion of the shaft 8 so that the stop 16 is held on the shaft 8 against rotation relative to the shaft by means of the flange. The other or left-hand end portion of the stop 16 (as seen in FIG. 1) is received within the larger diameter bore portion of the shaft and is flattened to provide an engaging member 16a as shown in FIG. 4. The flattened engaging member 16a of the stop 16 is fitted in a compensatively shaped notch 18 at the adjacent end of a bolt 17 to hold the bolt 17 against free rotation and the inner end face of the bolt 17 abuts against the backing plate of the friction pad 5.

A nut 19 is threadably received on the bolt 17 and waved washers 21a, 21b abut against the opposite sides 19b, 19c of the radial and outward extension of the nut 19, respectively within the bore 4 defined by the caliper housing half portion 1b. The waved washers 21a, 21b are held in position by the shoulder 6 in the caliper housing half portion 1b and a stop ring 20 secured to the bore 4, respectively, whereby the nut 19 is positioned in a pre-determined position on the bolt 17 within the bore 4 in the caliper housing half portion 1b. An annular spacer 22 is interposed between the washer 21b and stop ring 20 so that the rightward spring force applied to the nut by the waved washer 21b is designed greater than the leftward spring force applied to the nut by the waved washer 21a whereby the nut 19 is normally biased against the inner end face of the shaft 8.

Figure 3:
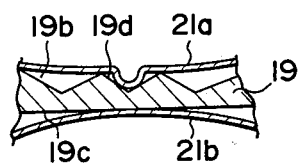
FIG. 3 is a cross-sectional view taken along substantially the line III—III of and as seen in the arrow direction in FIG. 1.

At least one of the opposite sides 19b, 19c of the radial and outward extension of the nut 19 (the side 19b in the illustrated embodiment) is provided with a recess 19d (see FIG. 3) for receiving the mating projection of the waved washer 21a which abuts against the side 19b whereby the nut 19 is prevented from inadvertently rotating on the bolt 17 due to the sway of the vehicle in which the mechanical disc brake is mounted or other causes. If desired or necessary, the waved washer 21a may be secured to the shoulder 6 in the caliper housing half portion 1b by means of suitable securing means (such as set bolts or convexed and concaved engaging means).

Interposed between the nut 19 and shaft 8 is a ratchet mechanism comprising a ratchet spring 23 having a pawl 23a secured to the flange 8a of the shaft 8 and teeth 19a formed on the outer end face of the nut 19 and the ratchet mechanism is adapted to transmit the rotation of the shaft 8 to the nut 19 only in one direction. The ratchet mechanism transmits only the rotation of the shaft 8 to the nut 19 on the return stroke after one application of the brake.

Figure 5:
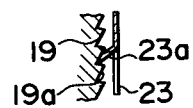
FIG. 5 is a cross-sectional view taken along substantially the line V—V of and as seen in the arrow direction in FIG. 1.

The disc brake having the construction and arrangement of the parts referred to hereinabove operates as follows:

In operation, when the manipulation lever 14 is pulled toward the driver, the shaft 8 and stop 16 rotate together with the lever 14. The rotation of the shaft 8 and stop 16 rotates the flange 8a which in turn rolls the ball 13 within the spherical recesses 11, 12 whereby the shaft 8 and stop 16 advance (move leftwards as seen in FIG. 1) against the spring force of the waved washers 15, 21a and 21b while the shaft 8 and stop 16 are rotating. As the shaft 8 and stop 16 advance, the nut 19 also advances, but in the initial stage of the advancement of the nut 19, a relatively small amount of frictional resistance occurs between the nut 19 and shaft 8 and not all of the rotation of the shaft 8 is transmitted to the nut 19. Thus, in this case, a relative variation occurs in the rotation between the shaft 8 and nut 19 about their axes and the pawl 23a of the ratchet mechanism advances to disengage from the now meshing tooth 19a and engage the immediately following tooth as appreciated from FIG. 5. The advance of the nut 19 carries the bolt 17 therewith and when the nut 19 has advanced by a predetermined distance, the bolt 17 applies the friction pad against the disc 2 to produce a reaction force which in turn moves the caliper housing 1 rightwards as seen in FIG. 1 and in consequence, the friction pad 3 is also applied against the disc to thereby brake the disc as shown in FIG. 1.

When the braking force is produced, the resulting force reacting to the breaking force increases the frictional force between the shaft 8 and nut 19 so that the nut 19 can rotate together with the shaft 8.

When the manipulation lever 14 is released, all the movable parts of the disc brake are returned to their initial positions under the spring force of the waved washers 15 and 21b.

When the friction pads 3, 5 have worn away a predetermined amount, the pawl 23a of the ratchet mechanism advances by the distance corresponding to one tooth 19a on the brake application stroke and transmits the rotation of the shaft 8 to the nut 19 on the return stroke. Such rotation of the nut 19 advances the bolt 17 by a predetermined distance. In this way, even when the friction pads 3, 5 have worn away, the stroke necessary for applying the brake can be always provided by compensating for the wear amount of the friction pads within a predetermined range.

As clear from the foregoing description of one preferred embodiment of the invention, according to the present invention, since wear of the friction pads can be automatically compensated for and the nut 19 is prevented from freely rotating by means of the waved washers 21a and/or 21b even when the vehicle sways, a constantly stabilized pad clearance can be maintained.

According to the present invention, it is clear that even when a recess is formed in the side 19c of the radial and outward extension of the nut 19 facing to the waved washer 21b, the same effects as mentioned hereinabove can be obtained.

While only one embodiment of the invention has been shown and described in detail it will be understood that the same is for illustration purpose only and not to be taken as a definition of the invention, reference being had for this purpose to the appended claims.

What is claimed is:

1. A mechanical disc brake comprising an input shaft axially displaceable upon receipt of a rotational movement input, a bolt connected at one end to said input shaft for receiving only said rotational movement of the shaft and abutting at the other end against a friction pad, a nut threaded on said bolt for normally receiving said axial displacement of the input shaft and also for receiving said rotational movement of the input shaft when subjected to clamping force, waved washers disposed on the opposite sides of a radial and outward extension of said nut to normally bias the nut against said input shaft, and a ratchet mechanism disposed between said input shaft and nut to transmit said rotational movement of the input shaft to said nut so as to displace the bolt toward said friction pad in accordance with the rotational amount of the input shaft, characterized in that at least one side of said radial and outward extension of the nut is formed with at least one recess for receiving the projection of one of said waved washers whereby inadvertent rotation of the nut is prevented.

2. The mechanical disc brake as set forth in claim 1, further comprising a caliper housing including two opposed half portions in one of which said input shaft is received for axial displacement and rotational movement and said friction pad is slidably received and to the other of which another friction pad is attached.

3. The mechanical disc brake as set forth in claim 1, in which said ratchet mechanism comprises a ratchet spring having a pawl secured to the flange of said input shaft and a plurality of teeth formed on one side of said nut.

* * * * *